United States Patent [19]

Borrowman et al.

[11] 4,241,028

[45] Dec. 23, 1980

[54] SORPTION OF TUNGSTEN FROM ALKALINE SOLUTIONS

[75] Inventors: S. Ralph Borrowman, Bountiful; Paulette B. Altringer, Summit Park, both of Utah

[73] Assignee: The United States of America as represented by the Secretary of the Interior, Washington, D.C.

[21] Appl. No.: 27,134

[22] Filed: Apr. 4, 1979

[51] Int. Cl.³ .............................................. C01G 41/00
[52] U.S. Cl. .................................. 423/54; 75/101 BE; 521/39; 423/DIG. 14
[58] Field of Search .............. 423/54, DIG. 14, 658.5; 75/101 BE; 521/39

[56] References Cited

PUBLICATIONS

Osborn, "Synthetic Ion-Exchangers", Chapman & Hall et al., London, 1961, pp. 1-5.
Altringer et al., "Bureau of Mines, RI 8315", Dept. of Interior, Wash., D.C., 1978.
Degeiso et al., "Jour. of Applied Polymer Science", vol. 9, 1965, pp. 411-419.
Pennington et al., "Industrial & Engineering Chem.", vol. 51, 1959, pp. 759-762.
Gregor et al., "Industrial & Engineering Chem.", vol. 44, 1952, pp. 2834-2839.

*Primary Examiner*—Herbert T. Carter
*Attorney, Agent, or Firm*—William S. Brown; Donald A. Gardiner

[57] ABSTRACT

An 8-hydroxyquinoline-resorcinol-formaldehyde ion exchange resin, in bead form, is employed for sorption of tungsten from alkaline solutions such as brines.

3 Claims, No Drawings

SORPTION OF TUNGSTEN FROM ALKALINE SOLUTIONS

The use of ion exchange resins for sorption of metal, or other, values is well known. For example, the use of resins for sorption of cupric ions from solutions containing high concentrations of sodium chloride is described by L. D. Pennington and M. B. Williams in "Chelating Ion Exchange Resins", *Ind. & Eng. Chem.* v. 51, no. 6, p. 759 (1959). Resins for sorption of metal values are disclosed by R. C. Degeiso, L. G. Donaruma and E. A. Tomic in "Preparation and Chelating Properties of 8-hydroxyquinoline, Formaldehyde Polymers", *Journal of Applied Polymer Science,* v. 9, p. 511 (1965). British Pat. No. 1,392,663 discloses production of spherical beads of less than 20-micron diameter from acrylic acid and divinyl benzene by suspension polymerization in dichloroethane and a nonswelling agent. Japanese Pat. No. 75,107,092 discloses suspension polymerization of an aqueous solution of imino diacetic acid, phenol and formaldehyde in carbon tetrachloride-chlorobenzene media. However, the ion-exchange resins prepared by, and employed in, these prior art processes have generally been deficient in adsorption efficiency or selectivity. Moreover, such processes generally result in formation of polymers in the form of stringy masses, unless very rapid stirring is used which results in formation of very small beads.

It has now been found, according to the present invention, that ion exchange resin beads essentially spherical in form and having a diameter of about 300–850 microns may be prepared by copolymerization of 8-hydroxyquinoline, resorcinol and formaldehyde in suspension in a suitable organic medium in the presence of a dispersant, and that the resulting beads are more porous and have a higher ion exchange capacity than resin powders or granules prepared by conventional means such as crushing and screening bulk polymerized resin. In addition, the beads of the invention offer less resistance to the flow of solution through an ion-exchange column.

The resin beads of the invention have been found to be particularly useful for recovery of tungsten from natural alkaline brines, such as that of Searles Lake, California, which contains about 50 percent of known U.S. tungsten reserves, the tungsten being in concentrations of about 50 to 70 parts per million. This brine is a naturally occurring, dense, saturated brine containing, in percent, approximately 3.0 KCl, 16 NaCl, 6.3 $Na_2CO_3$, 1.8 $Na_2B_4O_7$, 7.0 $Na_2SO_4$, 0.006 $WO_3$, and minor amounts of various other salts totaling about 35 percent by weight. It has a pH of about 9.5 to 10. The resin beads of the invention are, however, also effective for adsorption of tungsten from aqueous media other than the natural alkaline brines, e.g., from tungsten-loaded carbonate leach liquors.

The resin beads are prepared by essentially conventional suspension polymerization procedures in which an aqueous solution of the monomers is suspension polymerized in a water-immiscible organic medium. Applicants have found that the presence of a dispersant, in suitable amounts, is essential to formation of resin beads of the desired shape, size, porosity and ion exchange capacity.

The polymerization reaction is carried out by suspension and dispersion of aqueous solutions of the monomers in a suitable organic suspending medium, including the required dispersant, at a temperature and for a time sufficient to complete the polymerization reaction and form the beads utilized in the sorption process of the invention. The preferred suspending medium is chlorobenzene; however, other conventional water-immiscible liquids such as bromobenzene, kerosine, mineral oil, toluene, xylene, or halogenated hydrocarbons may also be used.

Dispersants suitable for use in preparation of the resin beads include conventional surface active agents such as sorbitan monooleate, polystyrene, sorbitan laurate, glycerol laurate, and aliphatic amines and amides. "SPAN 80", available from Atlas Chemical Industries, Inc. and consisting of sorbitan monooleate, has been found to be particularly effective for formation of the beads, particularly when chlorobenzene is employed as suspending agent. Optimum proportions of the dispersant in the suspending agent will vary with the particular combination of dispersant, suspending agent, and monomers and is best determined experimentally. However a concentration of about 5 to 10 grams per liter will generally be satisfactory.

Proportions of the monomers used in preparation of the polymer beads are generally not critical and, again, optimum proportions are best determined experimentally. However, proportions of about 0.5 to 1.5 moles of resorcinol and about 3 to 5 moles of formaldehyde per mole of 8-hydroxyquinoline will generally give satisfactory results. Concentrations of the monomers in the aqueous solution, or solutions, prior to suspension in the suspending agent may also vary considerably, again depending on the above-discussed variables. However, the size of the resulting beads has been found to generally increase with increase in the viscosity of the aqueous solutions prior to addition to the suspending agent. A viscosity of the aqueous solution, or solutions, is therefore preferably about 100 centipoises, although viscosities of from about 5 to 1000 centipoises give useful results.

Proportions of the aqueous solutions of the monomers in the suspending agent will be those conventionally employed in suspension polymerization processes, with amounts of the aqueous solutions being about 65 to 100 volume percent of the suspending agent.

The polymerization reaction is carried out at a moderately elevated temperature, with a range of about 35° to 100° C. generally being satisfactory. The reaction is base catalyzed, preferably with sodium hydroxide in an amount to provide a pH of about 11 to 12 in the aqueous solution of the monomers. Gentle agitation of the reaction mixture, i.e., the suspension of the aqueous solution of the monomers in the suspension medium, is employed to maintain adequate admixture of the reactants. Where a mechnical agitator is employed, a good yield of beads in the preferred range of about 300 to 850 microns diameter is generally obtained with an agitator speed of about 50 to 150 rpm, with optimum speed depending on the particular agitator design. Bead size has been found to generally decrease with increase in agitation intensity.

Reaction time must be sufficient to substantially complete the polymerization reaction and form the spherical polymer beads employed in the invention. In addition, bead hardness has been found to generally increase with increased retention time in the suspension medium at the reaction temperature. Generally, hard beads are stronger and more durable, although softer beads may be preferred for certain ion exchange purposes. Accordingly, optimum reaction and retention time must be determined experimentally, although a time of about 3 hours to 30 hours is suitable. Lower polymerization temperatures may, however, require longer retention times for good results.

Preparation of the ion exchange resin beads will be more specifically illustrated by the following example.

EXAMPLE 1

A mixture of 26 grams of 8-hydroxyquinoline, 134 milliliters of 2 N sodium hydroxide, and 59 milliliters of 37 percent aqueous formaldehyde was stirred slowly for 1 hour. The temperature of the mixture was held below 40° C. to prevent the formation of an insoluble polymer; and, during this period the 8-hydroxyquinoline dissolved to give a clear red solution. The solution was cooled to 30° C. and a solution of 19.5 grams of resorcinol in 113 milliliters of 2 N sodium hydroxide was added, followed by the addition of 58 milliliters of 37 percent aqueous formaldehyde. The temperature of the resulting solution increased to 47° C. and was held for a period of 1 hour, or until the viscosity of the solution was 100 centipoises as measured using a Brookefield viscometer. The 400 milliliter volume of warm aqueous solution was added rapidly to 600 milliliters of chlorobenzene at 90° C. containing 6.7 grams per liter of the dispersant SPAN 80. The reaction was conducted in a heated, one liter, three-necked round bottom flask with reflux condenser and a flat-bladed stirrer. Polymerization was complete in 24 hours at a reflux temperature of 86° C. The resin beads were then filtered, washed with water and methanol, and screened. Typically, 85 percent of the beads ranged in size from 20- to 48-mesh. The liquid portion containing chlorobenzene, SPAN 80, and water was clarified by settling and the organic phase could then be recycled.

As discussed above, the 8-hydroxyquinoline-resorcinol-formaldehyde resin beads are very effective for recovery of tungsten from alkaline solutions, particularly from Searles Lake brines. In addition to high capacity for tungsten, even from alkaline brines, the resin beads of the invention exhibit high selectivity for tungsten over other ions found in the alkaline solutions, particularly arsenic. Furthermore, adsorption of tungsten by the resin beads is actually enhanced by the presence of borate ion, which is commonly found in natural brines such as those of Searles Lake.

The resin beads may be employed in any conventional manner for contacting solid sorbents with feed solutions. Generally, the resin beads are most efficiently employed in the form of conventional static ion exchange columns in which sorption of the tungsten is achieved by passing the feed solution through a column of the resin. Elution of the tungsten from the resin is then achieved by means of aqueous eluants, which may consist of distilled, or otherwise purified or potable, water, as well as alkaline solutions such as brackish water. Optimum size and shape of the columns, as well as flow rates of feed and eluant solutions, will vary with the specific feed solution, specific composition and size of the resin beads, and temperature, and are best determined experimentally. Generally, room temperature is satisfactory; however, increased elution temperature, e.g., from about 50° to 75° C., generally results in increased rate of $WO_3$ elution, as well as the concentration of $WO_3$ in the eluant, thereby decreasing the amount of eluant required.

Although, as discussed above, the resin beads of the invention are effective for sorption of tungsten from alkaline solutions, excessive alkalinity of the feed solutions, e.g., a pH of about 8 or more, may result in decreased $WO_3$ sorption. In such cases, it may be desirable to lower the pH of the feed solution to a pH of about 7 to 8 by addition of an acidic reagent such as carbon dioxide.

The following examples will more specifically illustrate the use of the resin beads of the invention for sorption of tungsten from an alkaline solution.

EXAMPLE 2

A 467-ml portion of resin beads prepared by a process essentially the same as that of Example 1, and sized to −20, +48 mesh, was placed in a glass column 1 inch in diameter to a height of 36 inches. The resin was then loaded by passing 75 liters (160 bed-volumes) of a carbonated brine down the column at a flow rate of 5 gallons per minute per square foot of resin bed surface area. The pH of the brine was 7.5 and it contained, in grams per liter, 0.07 $WO_3$, 140 Cl, 123 Na, 13 $B_4O_7$, 68 $SO_4$, 25 K, 8 $CO_3$, 5 $HCO_3$, 0.8 $PO_4$, 0.8 Br, 0.7 $S^=$, 0.2 As and 0.1 I. During loading, $WO_3$ concentrations in the spent feed were measured and found to range, in grams per liter, from 0.025 $WO_3$ after 23 liters (50 bed-volumes) of brine was processed, to 0.050 $WO_3$ after 47 liters (100 bed-volumes) of brine, and to 0.058 $WO_3$ after 75 liters (160 bed-volumes) of brine.

The loaded resin was then eluted with 1821 ml (3.9 bed-volumes) of distilled water at a temperature of 25° C. and flow rate of 0.1 gpm/sq. ft. Analysis of the eluate showed that 77 percent of the $WO_3$ was eluted. Temperatures of 50° and 75° C. were, however, found to result in substantially complete elution of $WO_3$ from the resin.

Similar results were obtained when brackish and potable waters were substituted for the distilled water.

EXAMPLE 3

One-milliliter portions of beads of the type employed in Example 2 were placed in four 1000 ml samples of carbonated brine. The brines were essentially the same as that of Example 2 except that pH values and $B_4O_7$ content was varied. Sample 1 had a pH of 7.5 and a $B_4O_7$ content of 12.5 g/l; sample 2 had a pH of 8.5 and a $B_4O_7$ content of 12.5 g/l; sample 3 had a pH value of 7.5 and a $B_4O_7$ content of 0.5 g/l; and sample 4 had a pH value of 8.5 and a $B_4O_7$ content of 0.5 g/l. The samples were placed in plastic bottles on a shaking table and shaken for 24 hours. The brine was analyzed before and after contact with the resin, and tungsten sorption was calculated by the difference. Tungsten sorption, in g/l of $WO_3$, was 8.0 for sample 1, 2.2 for sample 2, 6.9 for sample 3 and 0.7 for sample 4, thus illustrating decreased adsorption at the higher pH value, and enhanced tungsten sorption with higher borate concentration.

We claim:

1. A process for sorption of tungsten from alkaline brines containing about 50–70 ppm tungsten and having a pH of about 7 to 8 comprising contacting the brine with ion exchange resin beads consisting essentially of an 8-hydroxyquinoline-resorcinol-formaldehyde resin, said beads being essentially spherical in shape, having diameters in the range of about 300 to 850 microns and prepared by copolymerization of the monomers in suspension in chlorobenzene, said chlorobenzene containing a dispersant in an amount to result in formation of beads of the required size and shape.

2. The process of claim 1 in which the resin beads and solution are contacted by means of agitation of a mixture of the two.

3. The process of claim 1 in which the resin beads and solution are contacted by passing the solution through a column containing the beads.

* * * * *